(12) United States Patent
Friedholm et al.

(10) Patent No.: US 9,105,056 B2
(45) Date of Patent: Aug. 11, 2015

(54) METHODS AND SYSTEMS FOR COMMUNICATING EXPENSE MANAGEMENT INFORMATION

(71) Applicant: Cass Information Systems, Inc., Bridgeton, MO (US)

(72) Inventors: Carl N. Friedholm, Greer, SC (US); Angela Melissa Taylor, Inman, SC (US); Randy Edmonds, Fishers, IN (US); Gregory Steven Thomas, Lyman, SC (US)

(73) Assignee: Cass Information Systems, Inc., Bridgeton, MO (US)

( * ) Notice: Subject to any disclaimer, the term of this patent is extended or adjusted under 35 U.S.C. 154(b) by 0 days.

(21) Appl. No.: 13/631,257

(22) Filed: Sep. 28, 2012

(65) Prior Publication Data
US 2014/0095362 A1    Apr. 3, 2014

(51) Int. Cl.
*H04M 11/00* (2006.01)
*H04M 15/00* (2006.01)
*G06Q 30/04* (2012.01)
*H04W 4/24* (2009.01)

(52) U.S. Cl.
CPC . *G06Q 30/04* (2013.01); *H04W 4/24* (2013.01)

(58) Field of Classification Search
CPC ........................................................ H04W 4/24
USPC ........................................... 705/34; 455/406
See application file for complete search history.

(56) References Cited

U.S. PATENT DOCUMENTS

| | | | |
|---|---|---|---|
| 6,925,160 B1* | 8/2005 | Stevens et al. | 379/121.05 |
| 8,064,881 B2* | 11/2011 | Bugenhagen | 455/411 |
| 2008/0207167 A1* | 8/2008 | Bugenhagen | 455/411 |
| 2009/0030885 A1 | 1/2009 | DePasquale et al. | |
| 2009/0203352 A1* | 8/2009 | Fordon et al. | 455/406 |
| 2010/0017316 A1 | 1/2010 | Joseph et al. | |
| 2011/0250865 A1 | 10/2011 | Breitzman et al. | |
| 2012/0036220 A1 | 2/2012 | Dare et al. | |
| 2012/0096344 A1* | 4/2012 | Ho et al. | 715/249 |
| 2012/0302204 A1* | 11/2012 | Gupta et al. | 455/406 |

OTHER PUBLICATIONS

Personal calls on company cellphones cost big U.K. bucks. (Jun. 8, 2007). TelecomWeb News Break, , n/a. Retrieved from http://search.proquest.com/docview/207448996?accountid=14753.*

(Continued)

*Primary Examiner* — Scott Zare
(74) *Attorney, Agent, or Firm* — Armstrong Teasdale LLP

(57) ABSTRACT

Methods and systems for communicating expense management information between an expense management system and a mobile device are provided. The methods and systems include one or more applications for a mobile device, such as mobile phone, that enable a user, such as an expense manager for an entity such as a business entity or other organization, to use their mobile device to communicate and exchange data with an expense management system, such as a telecommunications expense management system. The methods and systems enable an expense manager to review and approve invoices, generate graphics to review usage or other data, and conduct data searches relative to the expenses being managed.

33 Claims, 12 Drawing Sheets

(56) References Cited

OTHER PUBLICATIONS

Computer software; AT&T expands free 'myWireless mobile' application to additional android devices. (Sep. 8, 2010). Telecommunications Weekly, 43. Retrieved from http://search.proquest.com/docview/749302087?accountid=14753.*

MTS breakthrough enables enterprises to control mobile phone usage and pricing;—new mobile phone reconciliation module quickly and easily identifies usage and rating overcharges without relying on service provider data—. (May 8, 2006). PR Newswire Retrieved from http://search.proquest.com/docview/447687035?accountid=14753.*

* cited by examiner

## FIG. 10

METHODS AND SYSTEMS FOR COMMUNICATING EXPENSE MANAGEMENT INFORMATION

BACKGROUND OF THE INVENTION

The embodiments described herein relate generally to methods and systems for managing payment of bills, and more specifically to network-based systems and methods for displaying an invoice on a mobile device and receiving approval of the invoice from the mobile device.

Corporations may rely on an expense manager to review invoices issued by a party who provides products and/or services to the corporation. It may be beneficial to the corporation to contract with the expense manager to handle the large number of invoices received by the corporation. Some invoices may be received by the expense manager in an electronic format. Other invoices may be received as paper documents and require scanning or data entry to process. Typically, the expense manager provides the corporation with reports that include invoice data in a format beneficial to the corporation, regardless of whether the invoices were received electronically or as paper documents. Typically, a manager with authority to approve invoices logs into a web-based portal provided by the expense manager. Using the portal, the manager is provided with invoices awaiting approval and an option to approve or deny each invoice. However, the process of reviewing and approving of the invoices typically requires a computer with a full-function web browser and Internet connectivity.

Use of mobile communication devices has become increasingly common. Such mobile communication devices may also include processors capable of running programs and display screens capable of displaying documents and/or data to a user.

Accordingly, it would be desirable to have mobile access to an expense management system for reviewing and/or approving of invoices that will address the disadvantages of the known systems described above.

BRIEF DESCRIPTION OF THE INVENTION

In one embodiment, a method for communicating expense management data using a mobile device, that includes a memory device and a display device coupled to a processing device, is provided. The method includes transmitting at least one of a user identifier and a password to an expense management system. The method further includes displaying at least one service option on the display device, wherein the at least one service option is one of a review invoice option, a review wireless usage option, a contacts directory search option, and a geographic location search option. The method further includes transmitting a user selection of the at least one service option from the mobile device to the expense management system. The method further includes receiving data associated with the user selection at the mobile device from the expense management system. The method further includes generating at least one output, using the processing device, based on the received data.

In another embodiment, a system for communicating expense management data using a mobile device that includes a memory device and a display device coupled to a processing device is provided. The system includes a database configured to store data associated with at least one of a user, an expense resource, an expense management system; a database server; one or more computers, each computer including a processing device and a memory; and at least one mobile device, each mobile device including a memory device and a display device coupled to a processing device. The database, database server, one or more computers, and at least one mobile device are configured to transmit at least one of a user identifier and a password to an expense management system. The database, database server, one or more computers, and at least one mobile device are further configured to display at least one service option on the display device, wherein the at least one service option is one of a review invoice option, a review wireless usage option, a contacts directory search option, and a geographic location search option. The database, database server, one or more computers, and at least one mobile device are further configured to transmit a user selection of the at least one service option from the mobile device to the expense management system. The database, database server, one or more computers, and at least one mobile device are further configured to receive data associated with the user selection at the mobile device from the expense management system. The database, database server, one or more computers, and at least one mobile device are further configured to generate at least one output, using the processing device, based on the received data.

In yet another embodiment, a mobile device for communicating expense management data includes a memory device and a display device coupled to a processing device is provided. The mobile device is configured to transmit at least one of a user identifier and a password to an expense management system. The mobile device is further configured to display at least one service option on the display device, wherein the at least one service option is one of a review invoice option, a review wireless usage option, a contacts directory search option, and a geographic location search option. The mobile device is further configured to transmit a user selection of the at least one service option from the mobile device to the expense management system. The mobile device is further configured to receive data associated with the user selection at the mobile device from the expense management system. The mobile device is further configured to generate at least one output, using the processing device, based on the received data.

DETAILED DESCRIPTION OF THE INVENTION

Figure 1:
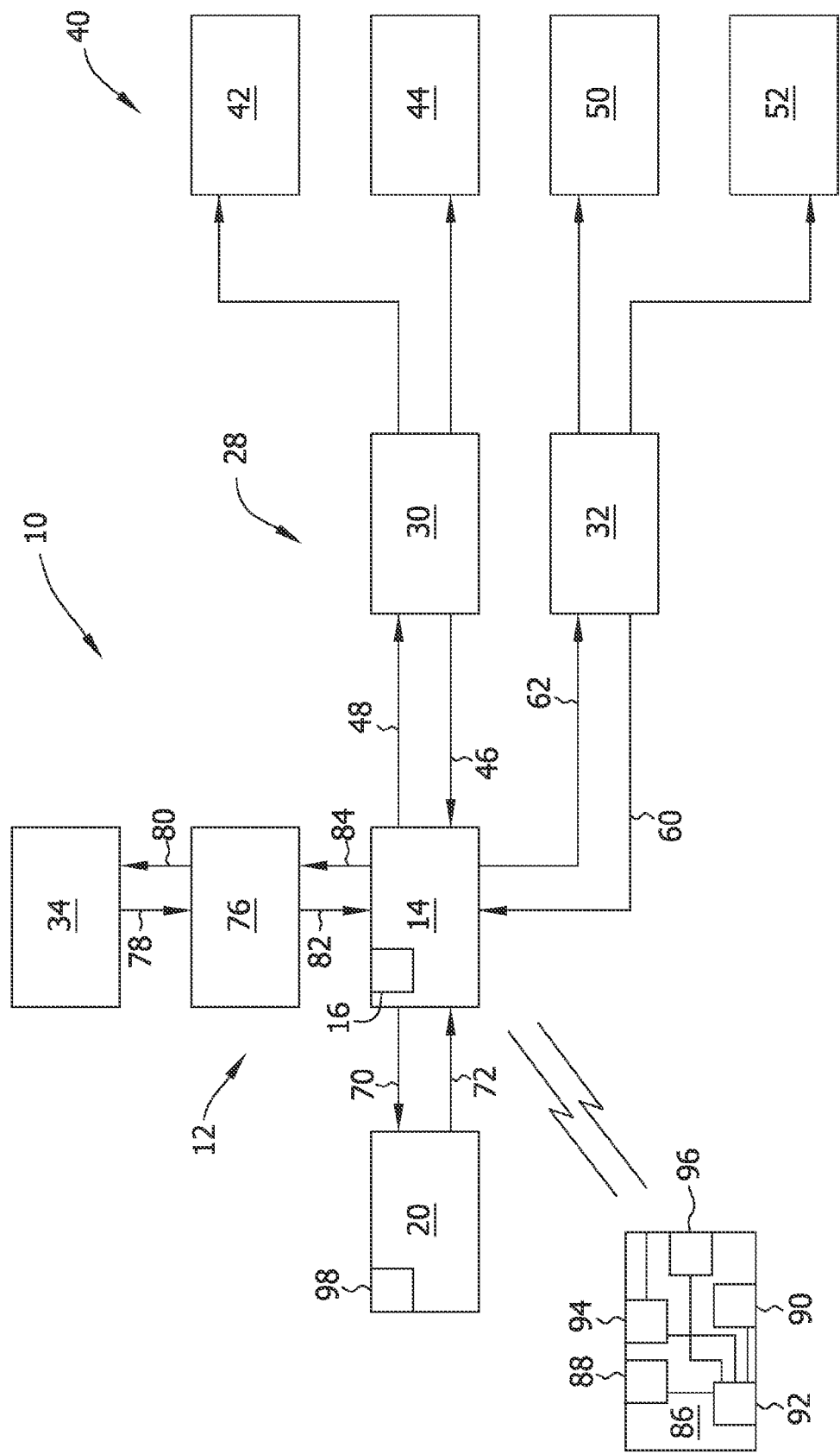
FIG. 1 is a schematic diagram illustrating an exemplary multi-party payment system that includes an expense manager.

The methods and systems described herein facilitate reviewing and approving of invoices using a mobile device. More specifically, a computer executable program is provided that when executed on a mobile device, allows a user to review and approve invoices wherever the mobile device is able to receive data.

As described herein, an employer contracts with an expense manager to manage payment of invoices for which the employer, and/or employees of the employer, is liable. The expense manager utilizes an expense management system to perform the processes described herein. In some embodiments, the expense manager is a separate entity from the employer, that is, a third-party who provides expense management services. In other embodiments, the functions of the expense manager and the expense management system are included within, and performed by, the employer. The expense management system provides the employer with reports of expenses paid by the employer and an inventory of devices associated with expenses paid by the employer. The methods and systems described herein allow the employer to access invoices awaiting review and to approve payment of the invoices using a mobile device. The mobile device includes a processor and may include a web browser. However, the web browsers typically included within a mobile device do not include all of the capabilities included within a web browser included within a desktop computer or a laptop computer. Furthermore, the wireless connection through which the mobile device receives data may be limited when compared to the high speed Internet connection utilized by desktop and laptop computers. The methods and systems described herein allow a user to access the expense management system using a mobile device and process data received from the expense management system in a manner that may be performed by the mobile device.

A technical effect of the methods and systems described herein include at least one of: (a) transmitting at least one of a user identifier and a password to an expense management system; (b) displaying at least one service option on the display device, wherein the at least one service option is one of a review invoice option, a review wireless usage option, a contacts directory search option, and a geographic location search option; (c) transmitting a user selection of the at least one service option from the mobile device to the expense management system; (d) receiving data associated with the user selection at the mobile device from the expense management system; (e) generating at least one output, using the processing device, based on the received data; (f) storing at least one mobile device application in the memory device, wherein the at least one mobile device application facilitates communicating expense management data using the mobile device; (g) executing a mobile device application on the mobile device, wherein the mobile device application comprises at least one of enabling a user to alter the size of a portion of a display on the mobile device, retrieving invoice data from a database remote from the mobile device, displaying one or more invoice pages, and displaying an invoice approval option; and (h) displaying an invoice approval button, selection of which causes transmission of a signal indicating approval of an invoice.

In one embodiment, a computer program is provided, and the program is embodied on a computer-readable medium and utilizes a Structured Query Language (SQL) with a client user interface front-end for administration and a web interface for standard user input and reports. In an exemplary embodiment, the system is web enabled and is run on a business-entity intranet. In yet another embodiment, the system is fully accessed by individuals having an authorized access outside the firewall of the business-entity through the Internet. In a further exemplary embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium.

The systems and methods are not limited to the specific embodiments described herein. In addition, components of each system and each method can be practiced independent and separate from other components and methods described herein. Each component and method also can be used in combination with other components and processes.

FIG. 1 is a schematic diagram 10 illustrating an exemplary multi-party payment system 12 that includes an expense manager 14. Expense manager 14 enables payment of expenses by an employer, for example, employer 20. In the exemplary embodiment, expense manager 14 includes an expense management system 16 configured to perform the processes described herein. Furthermore, in the exemplary embodiment, expense manager 14 is a separate entity from employer 20, that is, a third-party who provides expense management services. In an alternative embodiment, the functions of expense manager 14 and expense management system 16 are included within, and performed by, employer 20. Payment system 12 also includes a plurality of service providers 28, for example, a first service provider 30, a second service provider 32, and a third service provider 34. For example, first service provider 30 may be a first cellular service provider. Although illustrated as including three service providers, payment system 12 may include any suitable number of service providers that allows payment system 12 to function as described herein.

Employer 20 may include a corporation, a charitable group, and/or any other organization that employs a plurality of employees 40. Furthermore, the employees 40 may be independent contractors or in a similar relationship with employer 20. As part of an agreement with employees 40 (e.g., as part of an employment agreement), employer 20 may agree to provide employees 40 with a mobile device benefit. This benefit may include, but is not limited to, paying for costs associated with a mobile phone voice plan, a mobile phone data plan, and/or an internet connectivity plan with an internet service provider for employees 40. Employer 20 relies on expense management system 16 to review and pay the amounts included in invoices associated with employer 20 and/or amounts included in requests for reimbursement submitted by employees.

In the exemplary embodiment, employer 20 is responsible for expenses related to the mobile device benefit. For example, a first employee 42 and a second employee 44 of the plurality of employees 40 may use a mobile device associated with first service provider 30. In the exemplary embodiment, expense management system 16 receives an invoice 46 from first service provider 30 and submits funds 48 to first service provider 30 in exchange for the service provided to employees 42 and 44. Alternatively, employer 20 may receive invoice 46 and provide the invoice to expense management system 16 for processing. Furthermore, a third employee 50 and a fourth employee 52 of the plurality of employees 40 may use a mobile device associated with second service provider 32. Expense management system 16 receives an invoice 60 from second service provider 32 and submits funds 62 to second service provider 32 in exchange for the service provided to employees 50 and 52. In the exemplary embodiment, expense management system 16 may submit a request for approval 70 to employer 20. Request for approval 70 may include invoices 46 and 60. Employer 20 provides expense management system 16 with an authorization/denial 72 to request for approval 70.

In the exemplary embodiment, multi-party payment system 12 also includes at least one mobile device 86. In the exemplary embodiment, mobile device 86 includes a memory device 88 and a communications device 90 coupled to, or included within, a processing device 92. Mobile device 86 also includes a display device 94 coupled to processing device 92 for displaying information to a user of mobile device 86. Furthermore, mobile device 86 also includes an input device 96 coupled to processing device 92 for receiving an input command from a user and providing an input signal corresponding to the input command to processing device 92. Input device 96 may include, but is not limited to, a keypad, buttons, a trackpad, a trackball, and/or any other suitable type of input device that allows mobile device 86 to function as described herein. In the exemplary embodiment, display device 94 and input device 96 are combined, for example, in the form of a touch screen that displays information and also receives an input command when touched by the user. Mobile device 86 may be referred to as a mobile phone, a "smart" phone, a table computer, and/or any other device that allows payment system 12 to function as described herein.

In the exemplary embodiment, mobile device 86 is associated with employer 20. More specifically, mobile device 86 is assigned to a manager 98 employed by employer 20. Manager 98 uses mobile device 86 to send and receive data. Memory device 88 is configured to store at least one program, which may be referred to herein as an application. The application, when executed by processing device 92, provides a specific functionality to mobile device 86. In the exemplary embodiment, the application provides manager 98 with access to, and the ability to interact with, expense management system 16.

In the exemplary embodiment, expense management system 16 provides expense management data to mobile device 86. More specifically, manager 98 accesses expense management system 16 by executing the application stored on mobile device 86. The expense management data includes, but is not limited to, invoice data, mobile phone number data, and employee data. Invoice data may include data associated with invoices awaiting approval by manager 98 and/or data associated with payments made to service providers 28. The application stored within mobile device 86 processes the expense management data to display the information requested by manager 98.

Figure 2:
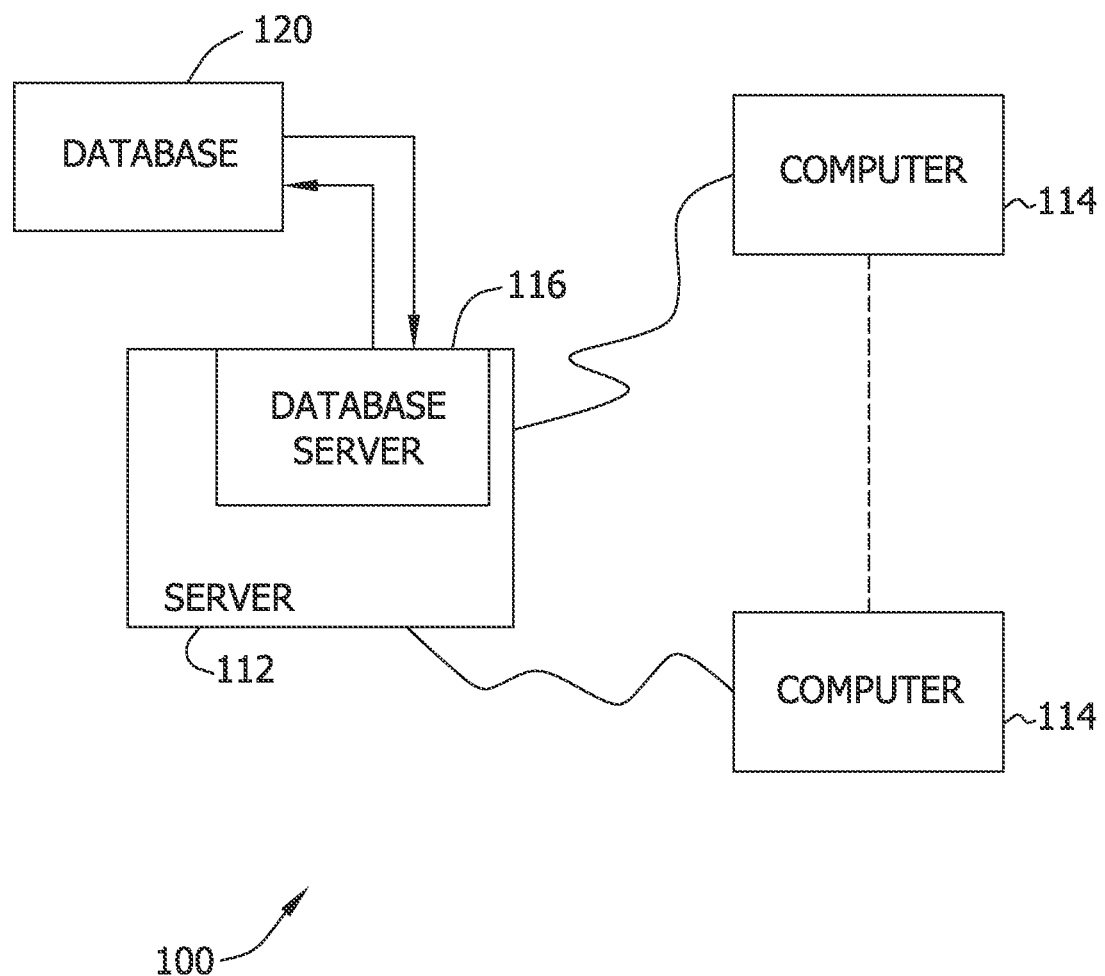
FIG. 2 is a simplified block diagram of an exemplary embodiment of server architecture of an expense management system, in accordance with one embodiment of the present invention.

FIG. 2 is a simplified block diagram of an exemplary system 100 in accordance with one embodiment of the present invention. System 100 is configured to implement the data flow shown in FIG. 1. In one embodiment, system 100 is an expense management system, for example, expense management system 16 (shown in FIG. 1), used to facilitate distribution of payments from an employer to a service provider and/or an employee. In addition, system 100 is operable as a reporting and inventory system, which can be utilized by employer 20 (shown in FIG. 1) to monitor expenses paid by expense manager 14.

More specifically, in the exemplary embodiment, system 100 includes a server system 112, and a plurality of client sub-systems, also referred to as client systems 114, connected to server system 112. In one embodiment, client systems 114 are computers including a web browser, such that server system 112 is accessible to client systems 114 using the Internet. Client systems 114 are interconnected to the Internet through many interfaces including a network, such as a local area network (LAN) or a wide area network (WAN), dial-in-connections, cable modems and special high-speed ISDN lines. Client systems 114 could be any device capable of interconnecting to the Internet including a web-based phone, personal digital assistant (PDA), or other web-based connectable equipment. A database server 116 is connected to a database 120 or other memory device containing information on a variety of matters, as described below in greater detail. In one embodiment, centralized database 120 is stored on server system 112 and can be accessed by potential users at one of client systems 114 by logging onto server system 112 through one of client systems 114. In an alternative embodiment, database 120 is stored remotely from server system 112 and may be non-centralized.

Figure 3:
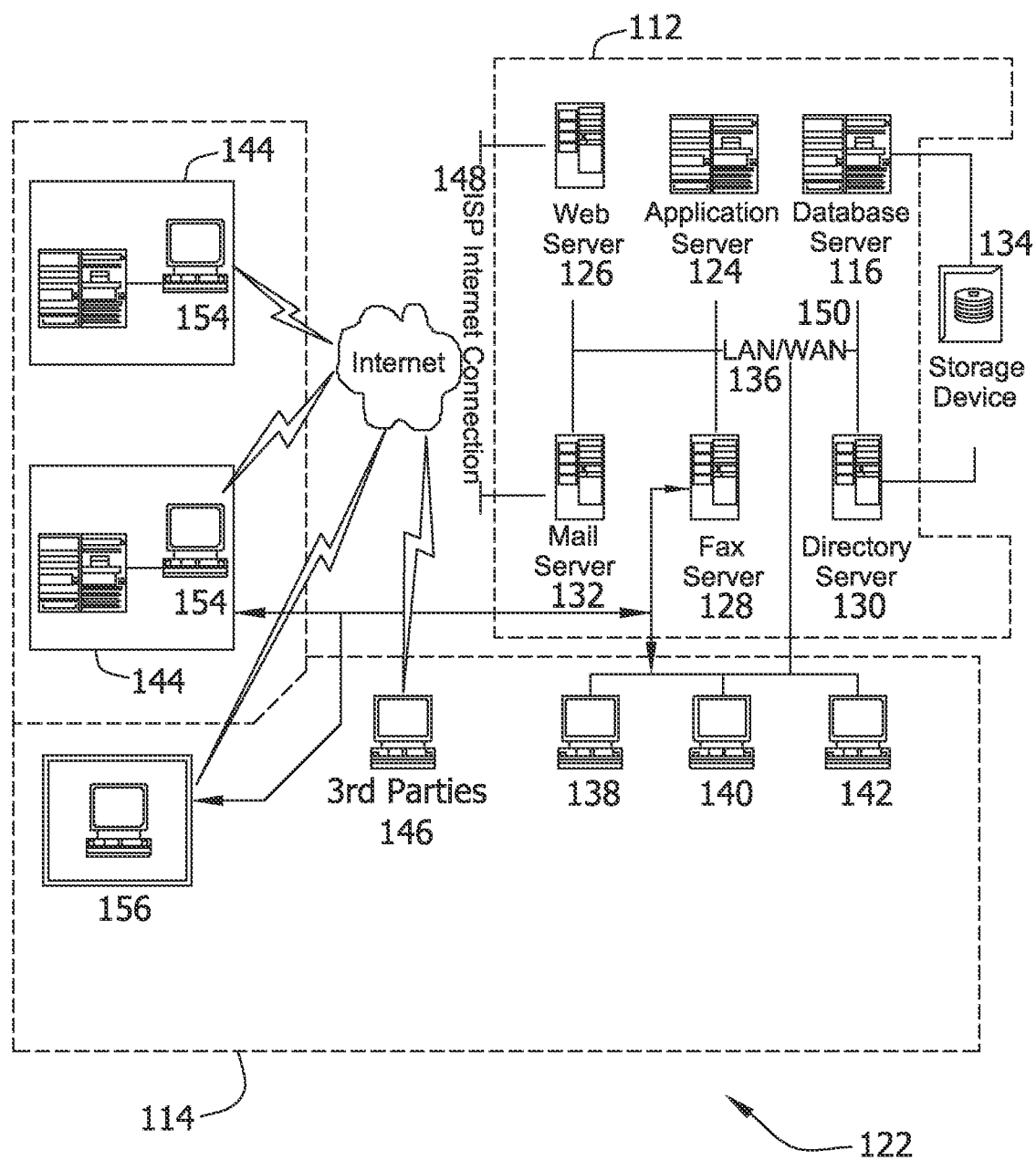
FIG. 3 is an expanded block diagram of an exemplary embodiment of server architecture of the expense management system shown in FIG. 2.

FIG. 3 is an expanded block diagram of an exemplary embodiment of server architecture of a system 122 in accordance with one embodiment of the present invention. Components in system 122, identical to components of system 100 (shown in FIG. 2), are identified in FIG. 3 using the same reference numerals as used in FIG. 2. System 122 includes server system 112 and client systems 114. Server system 112 further includes database server 116, an application server 124, a web server 126, a fax server 128, a directory server 130, and a mail server 132. A disk storage unit 134 is coupled to database server 116 and directory server 130. Servers 116, 124, 126, 128, 130, and 132 are coupled in a local area network (LAN) 136. In addition, a system administrator's workstation 138, a user workstation 140, and a supervisor's workstation 142 are coupled to LAN 136. Alternatively, workstations 138, 140, and 142 are coupled to LAN 136 using an Internet link or are connected through an Intranet.

Each of workstations 138, 140, and 142 may be any computing device that includes a web browser, for example, but not limited to, a personal computer, a laptop computer, a tablet computer, and/or a mobile phone. Although the functions performed at the workstations typically are illustrated as being performed at respective workstations 138, 140, and 142, such functions can be performed at one of many computing devices coupled to LAN 136. Workstations 138, 140, and 142 are illustrated as being associated with separate functions only to facilitate an understanding of the different types of functions that can be performed by individuals having access to LAN 136.

Server system 112 is configured to be communicatively coupled to various individuals, including employees 144 and to third parties, e.g., account holders, customers, auditors, etc., 146 using an internet service provider (ISP) Internet connection 148. The communication in the exemplary embodiment is illustrated as being performed using the Internet, however, any other wide area network (WAN) type communication can be utilized in other embodiments, i.e., the systems and processes are not limited to being practiced using the Internet. In addition, and rather than WAN 150, LAN 136 could be used in place of WAN 150.

In the exemplary embodiment, any authorized individual having a workstation 154 can access system 122. At least one of the client systems includes a manager workstation 156 located at a remote location. Workstations 154 and 156 are personal computers having a web browser. Also, workstations 154 and 156 are configured to communicate with server system 112. Furthermore, fax server 128 communicates with remotely located client systems, including a client system 156 using a telephone link. Fax server 128 is configured to communicate with other client systems 138, 140, and 142 as well.

Figure 4:
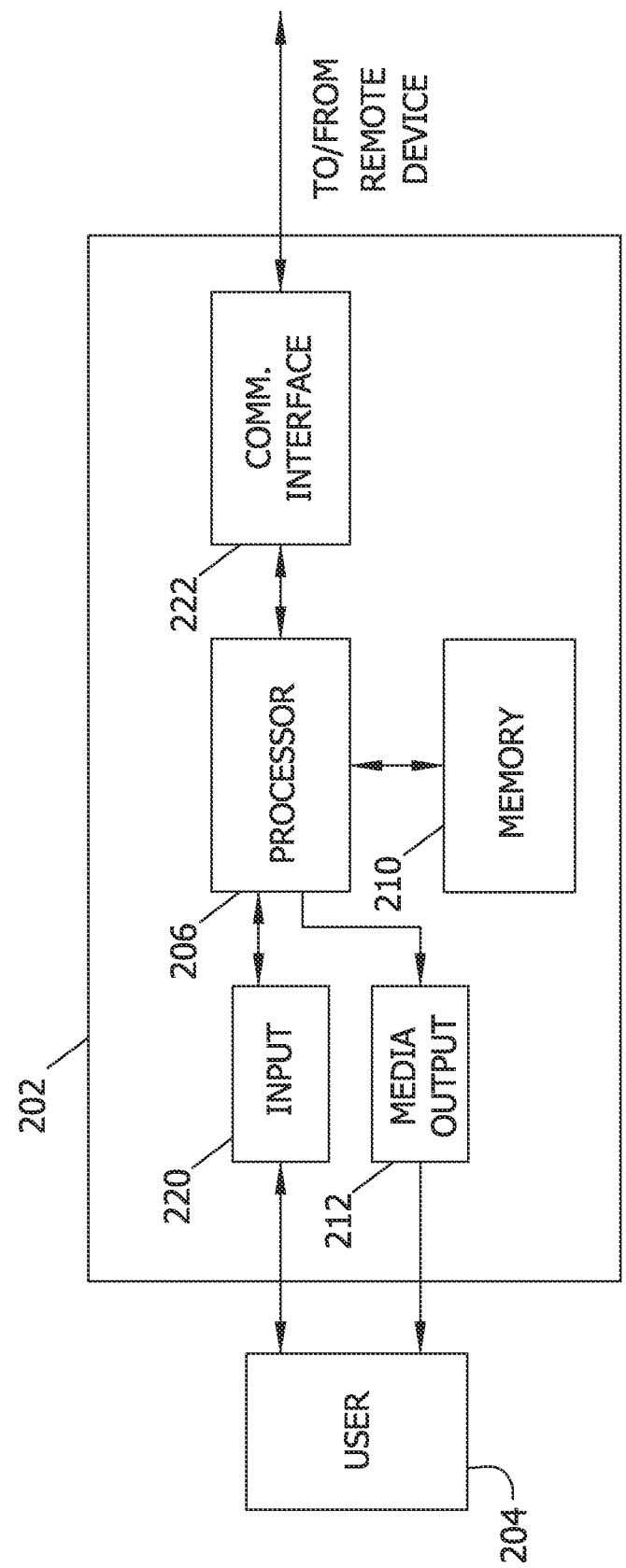
FIG. 4 illustrates an exemplary configuration of a client system shown in FIGS. 2 and 3.

FIG. 4 illustrates an exemplary configuration of a user computing device 202 operated by a user 204. User computing device 202 may include, but is not limited to, client systems 114, 138, 140, and 142, workstation 154, and manager workstation 156.

User computing device 202 includes a processor 206 for executing instructions. In some embodiments, executable instructions are stored in a memory area 210. Processor 206 may include one or more processing units (e.g., in a multi-core configuration). Memory area 210 is any device allowing information such as executable instructions and/or written works to be stored and retrieved. Memory area 210 may include one or more computer readable media.

User computing device 202 also includes at least one media output component 212 for presenting information to user 204. Media output component 212 is any component capable of conveying information to user 204. In some embodiments, media output component 212 includes an output adapter such as a video adapter and/or an audio adapter. An output adapter is operatively coupled to processor 206 and operatively coupleable to an output device such as a display device (e.g., a liquid crystal display (LCD), organic light emitting diode (OLED) display, or "electronic ink" display) or an audio output device (e.g., a speaker or headphones).

In some embodiments, user computing device 202 includes an input device 220 for receiving input from user 204. Input device 220 may include, for example, a keyboard, a pointing device, a mouse, a stylus, a touch sensitive panel (e.g., a touch pad or a touch screen), a gyroscope, an accelerometer, a position detector, or an audio input device. A single component such as a touch screen may function as both an output device of media output component 212 and input device 220.

User computing device 202 may also include a communication interface 222, which is communicatively coupleable to a remote device such as server system 112. Communication interface 222 may include, for example, a wired or wireless network adapter or a wireless data transceiver for use with a mobile phone network (e.g., Global System for Mobile communications (GSM), 3G) or other mobile data network (e.g., Worldwide Interoperability for Microwave Access (WIMAX)).

Stored in memory area 210 are, for example, computer readable instructions for providing a user interface to user 204 via media output component 212 and, optionally, receiving and processing input from input device 220. A user interface may include, among other possibilities, a web browser and client application. Web browsers enable users, such as user 204, to display and interact with media and other information typically embedded on a web page or a website from server system 112. A client application allows user 204 to interact with a server application from server system 112.

Figure 5:
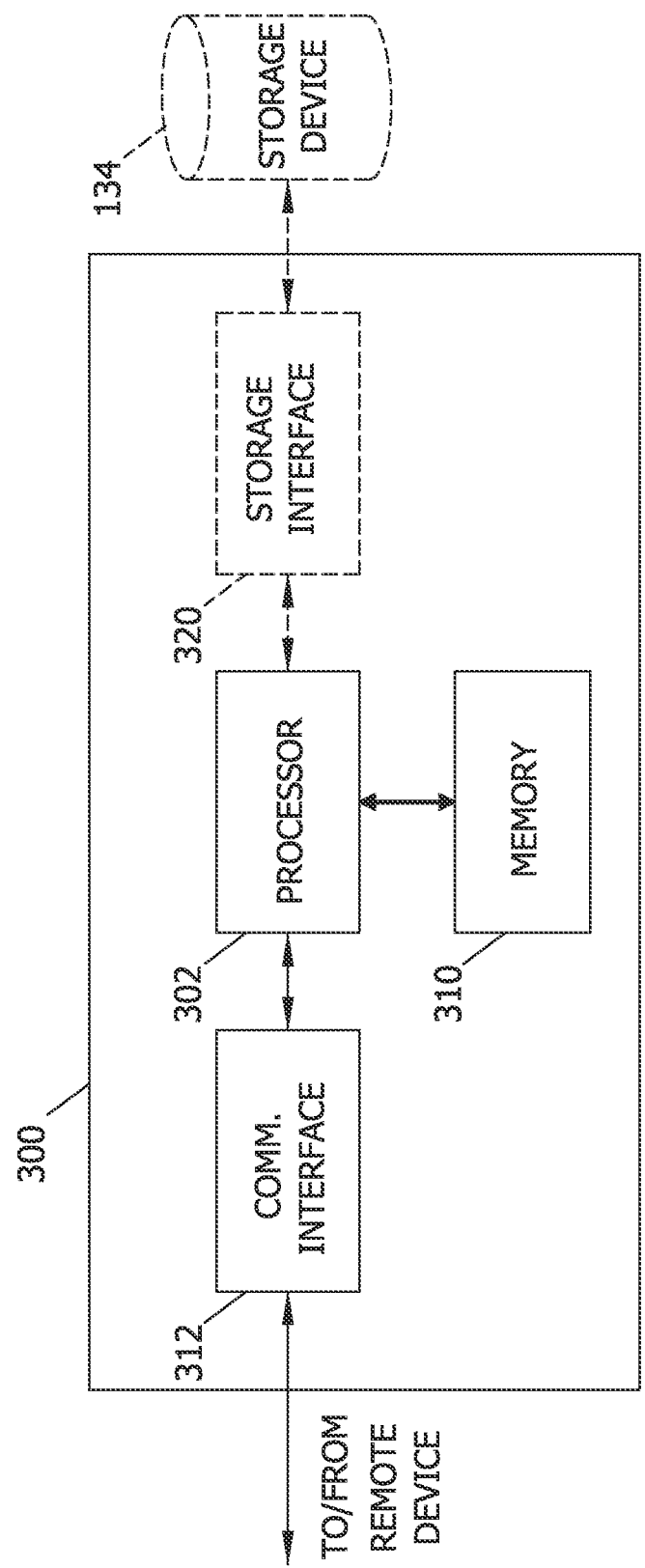
FIG. 5 illustrates an exemplary configuration of a server system shown in FIGS. 2 and 3.

FIG. 5 illustrates an exemplary configuration of a server computing device 300 such as server system 112 (shown in FIG. 2). Server computing device 300 may include, but is not limited to, database server 116, application server 124, web server 126, fax server 128, directory server 130, and mail server 132. Server computing device 300 also includes a processor 302 for executing instructions. Instructions may be stored in a memory area 310, for example. Processor 302 may include one or more processing units (e.g., in a multi-core configuration).

Processor 302 is operatively coupled to a communication interface 312 such that server computing device 300 is capable of communicating with a remote device such as user computing device 202 (shown in FIG. 4) or another server computing device 300. For example, communication interface 312 may receive requests from user computing device 114 via the Internet, as illustrated in FIG. 3.

Processor 302 may also be operatively coupled to a storage device 134. Storage device 134 is any computer-operated hardware suitable for storing and/or retrieving data. In some embodiments, storage device 134 is integrated in server computing device 300. For example, server computing device 300 may include one or more hard disk drives as storage device 134. In other embodiments, storage device 134 is external to server computing device 300 and may be accessed by a plurality of server computing devices 300. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 302 is operatively coupled to storage device 134 via a storage interface 320. Storage interface 320 is any component capable of providing processor 302 with access to storage device 134. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 302 with access to storage device 134.

In the exemplary embodiment, memory device 88 (shown in FIG. 1) is configured to store at least one program, which may be referred to herein as an application. The application, when executed by processing device 92 (shown in FIG. 1), provides a specific functionality to mobile device 86 (shown in FIG. 1). In the exemplary embodiment, the application provides manager 98 with access to, and the ability to interact with, expense management system 16, including, but not limited to, communicating expense management data between mobile device 86 and expense management system 16.

Figure 6:
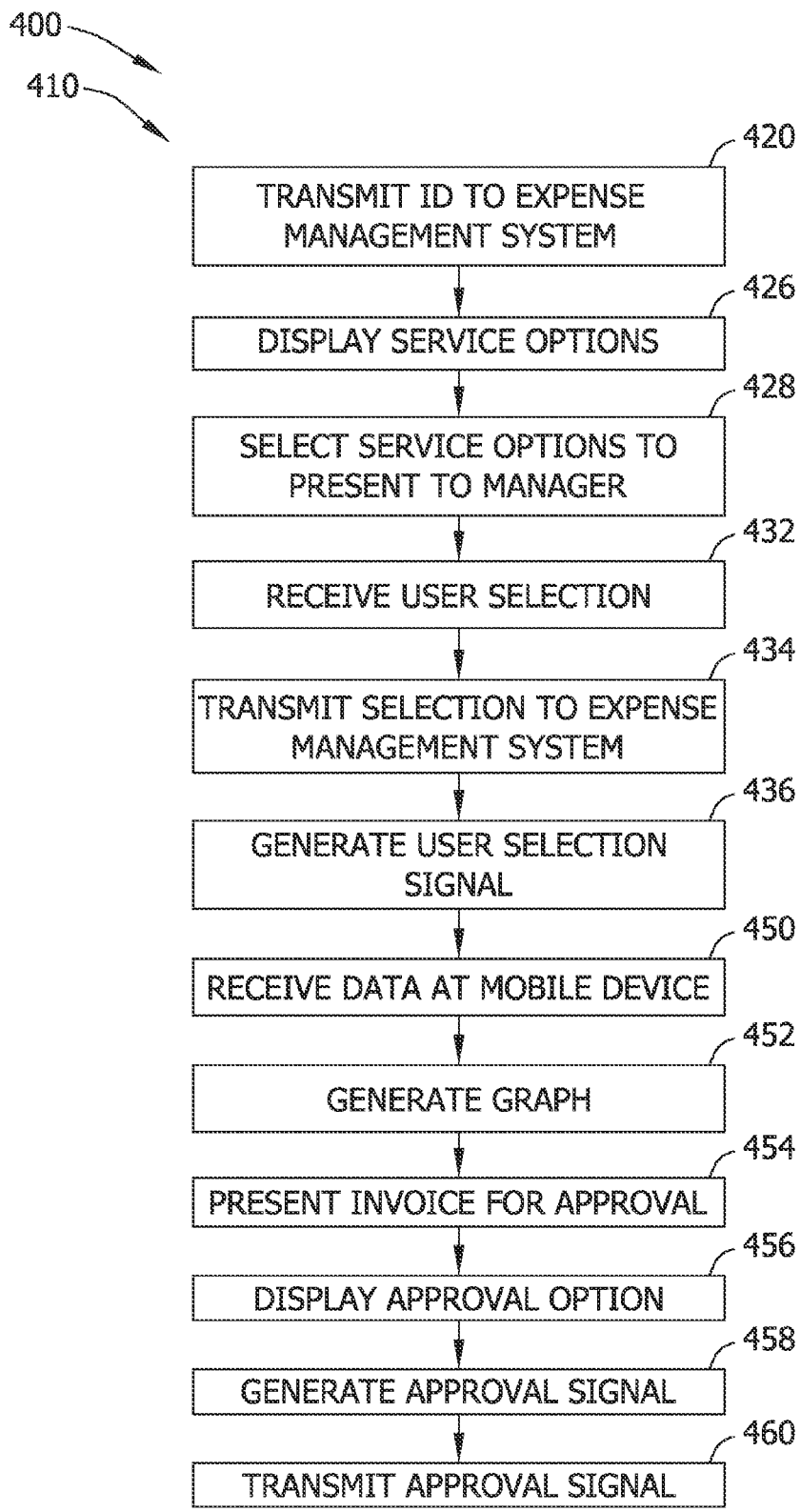
FIG. 6 is a flow chart of an exemplary method for communicating expense management data between the expense management system shown in FIGS. 2 and 3 and a mobile device.

FIG. 6 is a flow chart 400 of an exemplary method 410 for communicating expense management data. In the exemplary embodiment, communicating expense management data may include providing access to data stored by expense management system 16 (shown in FIG. 1) to a mobile device operated by a user, for example, manager 98 (shown in FIG. 1). Communicating expense management data may also include generating an approval response corresponding to manager approval of an invoice.

In the exemplary embodiment, method 410 includes transmitting 420 at least one of a user identifier and a password to an expense management system, for example, expense management system 16. The user identifier and password correspond to an employee of employer 20, for example, manager 98, and identify manager 98 to expense management system 16. Method 410 also includes displaying 426 at least one service option on a display device, for example, display device 94 (shown in FIG. 1). Expense management system 16 determines 428 which service options to present to manager 98 based on a security level associated with the user identifier. Service options may include, but are not limited to, a review invoice option, a review wireless usage option, a contacts directory search option, and a geographic location search option.

In the exemplary embodiment, method 410 also includes receiving 432 a user selection at mobile device 86. For example, manager 98 may provide a user selection to mobile device 86 via input device 96 (shown in FIG. 1). Method 410 also includes transmitting 434 the user selection of the at least one service option from mobile device 86 to expense management system 16. For example, transmitting 434 the user selection may include generating 436, at mobile device 86, a user selection signal, and transmitting the user selection signal to expense management system 16.

In the exemplary embodiment, method 410 includes receiving 450 data at mobile device 86 from expense management system 16. The data may include, but is not limited to, expense management data associated with employer 20. The data transmitted by expense management system 16 is dependent upon the security level associated with the user identifier provided when logging into expense management system 16. In the exemplary embodiment, method 410 also includes generating 452 at least one graph based on the received data. For example, mobile device 86 receives 450 data and processes the data before displaying expense management information on display device 94. The application also provides the user with information manipulation options, for example, the ability to increase the size of a section of the display (i.e., zoom in on a piece of data or a portion of a graph).

Furthermore, method 410 also includes, when the security level associated with the user identifier permits, presenting 454 an invoice for approval to manager 98. More specifically, expense management information displayed on display device 94 may include an invoice that is awaiting approval by an authorized employee of employer 20 before expense manager 14 submits payment to a service provider associated with the invoice. Along with the invoice, the application may also display 456 an invoice approval option, for example, a button on display device 94 that if selected, indicates that manager 98 provides authorization to pay the invoice on behalf of employer 20. Once selected, mobile device 86 generates 458 an invoice approval signal and transmits 460 the invoice approval signal to expense management system 16. The invoice approval signal includes an identifier that identifies which invoice was approved by manager 98. For example, each invoice transmitted by expense management system 16 includes an invoice identifier to uniquely identify each invoice.

Figure 7:
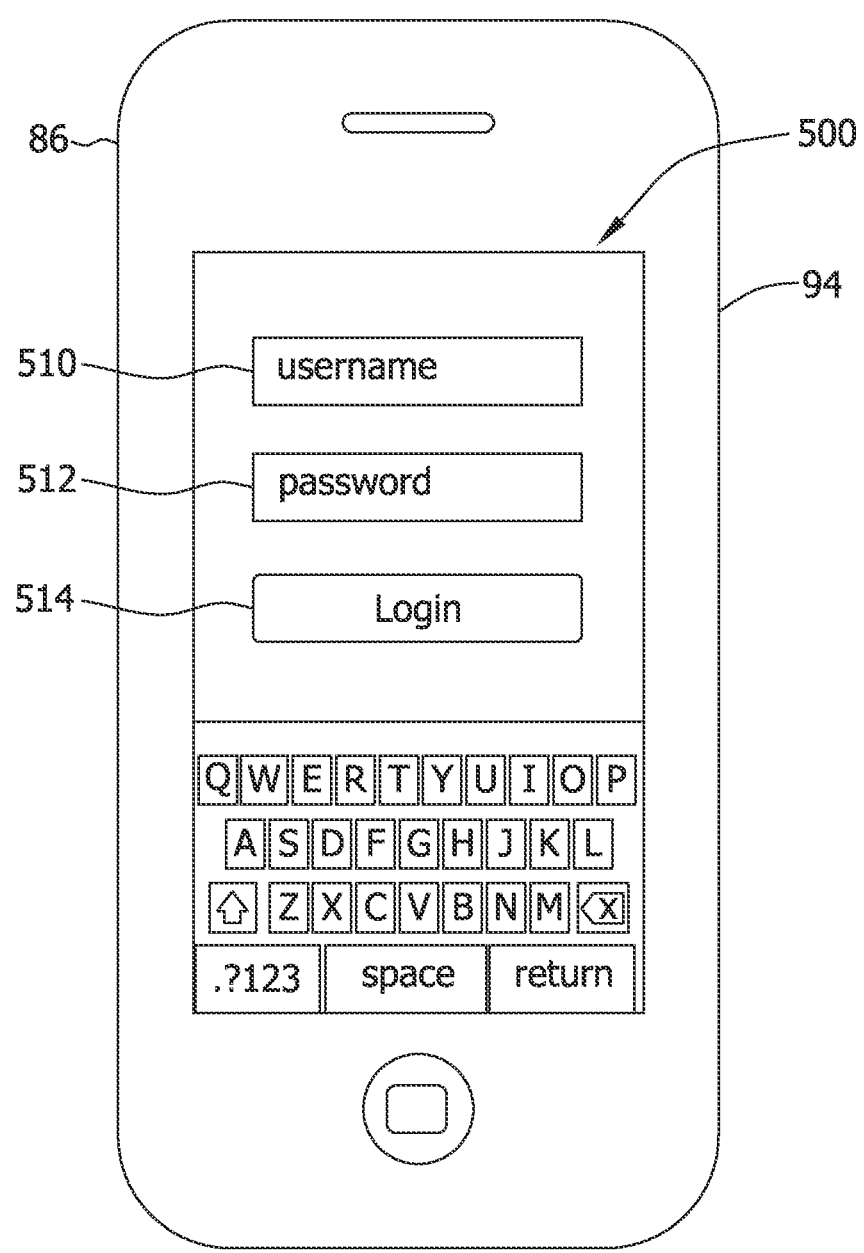
FIG. 7 is an exemplary screen shot of information displayed on a mobile device.

FIG. 7 is an exemplary screen shot 500 of information displayed on a mobile device, for example, mobile device 86 (shown in FIG. 1). When a user, for example, manager 98 selects an icon corresponding to the expense management application stored in memory device 88 of mobile device 86, screen shot 500 is displayed on display device 94. The application provides manager 98 with a first field 510 into which a user name/identifier can be entered. The application provides manager 98 with a second field 512 into which a password can be entered. Once manager 98 selects a login 514 option, mobile device 86 transmits the user name/identifier and password data to expense management system 16 for authorization.

Figure 8:
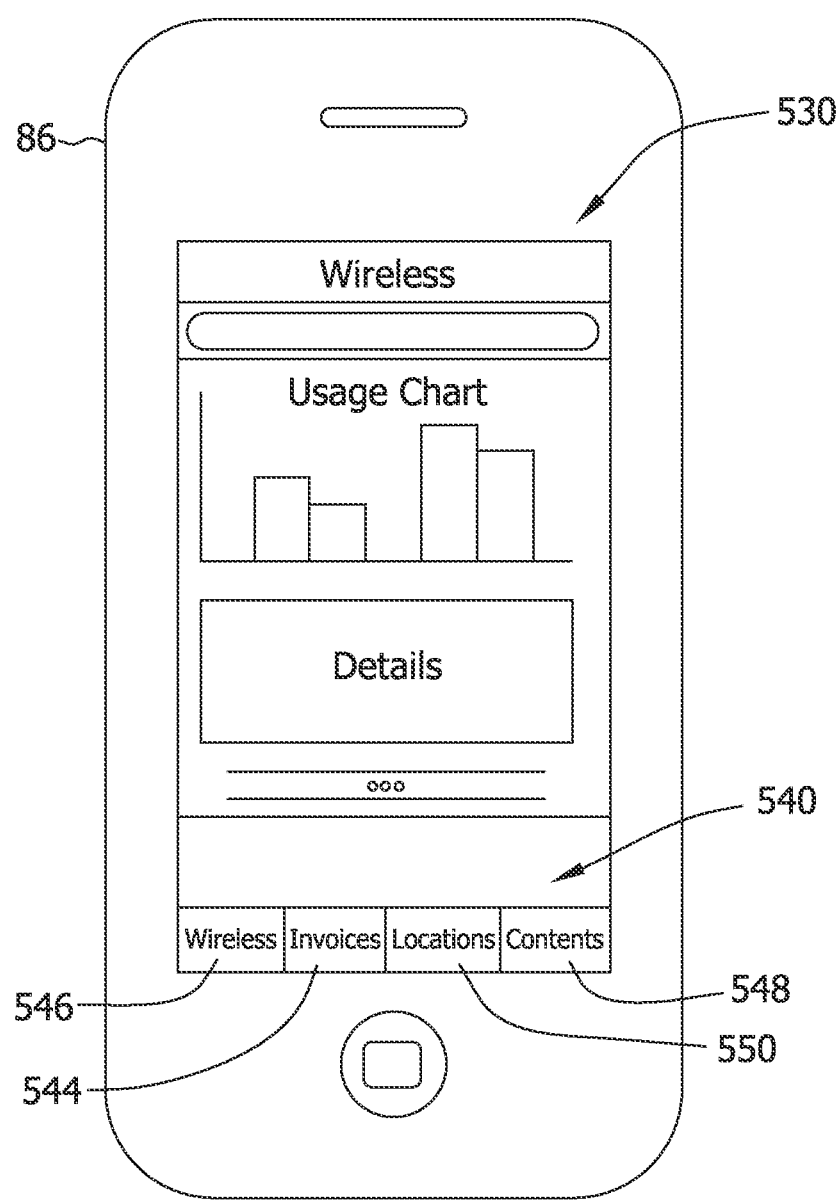
FIG. 8 is an exemplary screen shot of information displayed on a mobile device.

FIG. 8 is an exemplary screen shot 530 of information displayed on a mobile device, for example, mobile device 86 (shown in FIG. 1). Once the user name/identifier and password data have been authenticated by expense management system 16, expense management system 16 transmits an authorization signal to mobile device 86. In accordance with a security level included within the authorization signal, mobile device 86 displays service options 540. In the illustrated embodiment, service options 540 are displayed as tabs along a bottom portion of screen shot 530. Service options 540 may be referred to as displayed in a user interface (UI) TabBar. As described above, service options may include, but are not limited to, a review invoice option 544, a review wireless usage option 546, a contacts directory search option 548, and a geographic location search option 550. In an exemplary embodiment, access to review wireless usage option 546 or contacts directory search option 548 may require the user to have assigned to them a first security level, while access to geographic location search option 550 may require the user to have a second, higher security level, and access to review invoice option 544 may require the user to have a third, higher-still security level.

Figure 9:
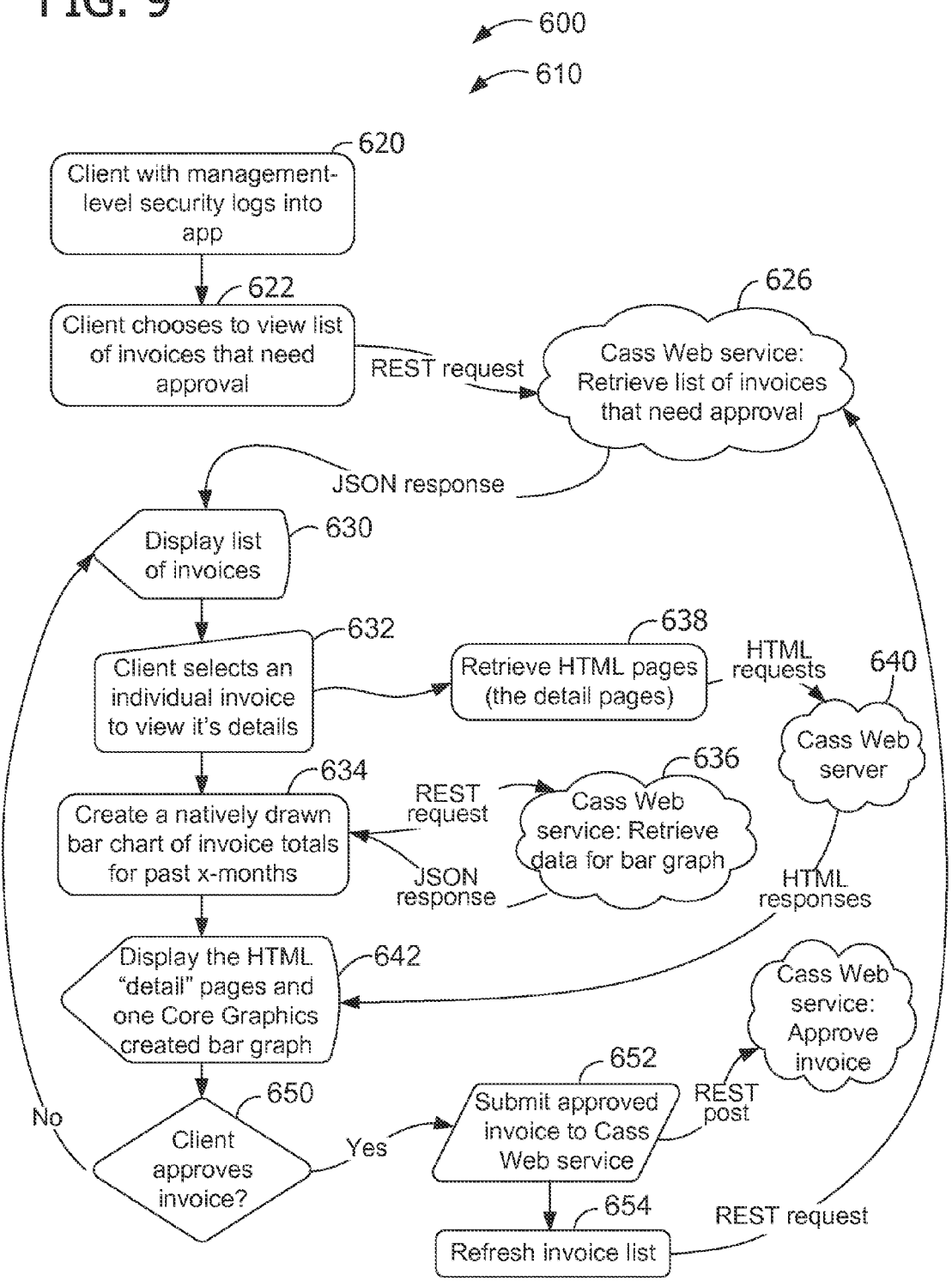
FIG. 9 is a flow chart of an exemplary method for communicating invoice data and approval between the expense management system shown in FIGS. 2 and 3 and a mobile device.

FIG. 9 is a flow chart 600 of an exemplary method 610 for communicating invoice data and approval between a mobile device, for example, mobile device 86 (shown in FIG. 1), and an expense management system, for example, expense management system 16 (shown in FIG. 1). In the exemplary embodiment, method 610 includes logging into 620 expense management system 16 using mobile device 86. As described above, logging into 620 expense management system 16 may include transmitting 420 (shown in FIG. 7) at least one of a user identifier and a password to an expense management system, for example, expense management system 16. The user, for example, manager 98, is logged into 620 expense management system 16 when mobile device 86 receives an authorization signal from expense management system 16. As described above, expense management system 16 authenticates the user identifier and password and transmits the authorization signal to mobile device 86.

In the exemplary embodiment, method 610 also includes receiving 622 a review invoice service option, for example, review invoice option 544 (shown in FIG. 8), selection from manager 98. Upon selection of the review invoice service option, mobile device 86 displays an approve invoices view to the manager 98. The approve invoices view consists of three main parts: an invoice list, a graph view, and an invoice details view.

Mobile device 86 and more specifically, the application stored and executed by processing device 92 (shown in FIG. 1), transmits a review invoice signal to expense management system 16. Expense management system 16 retrieves 626 data associated with invoices awaiting approval associated with employer 20 from an expense manager database 120 (shown in FIG. 2). The retrieved 626 invoice data is transmitted by expense management system 16, and received by mobile device 86. Mobile device 86 generates 630 a list of invoices awaiting approval from the invoice data and displays the invoice list on display device 94. Mobile device 86, and more specifically, input device 96, receives 632 an input signal from manager 98 that corresponds to a selection of one of the plurality of invoices included within the list. When manager 98 selects a specific invoice (e.g., by tapping on it), mobile device 86 provides manager 98 with the graph view and the invoice details view of data associated with the selected invoice.

In the exemplary embodiment, mobile device 86 generates 634 a natively drawn graphic representing historical totals associated with the selected invoice. For example, the graphic may include a bar chart illustrating invoice totals for a predefined number of months prior to the current month. More specifically, in at least one embodiment, the graph view is a representation of the wireless usage charges on the specific invoice and the graph may be able to display between, for example, 3 and 13 months of data. The graphic is created natively by processing device 92 using, for example, an application programming interface ("API"), such as those developed under the names Core Graphics™ and/or Core Animation® by Apple Inc. An API is a specification intended to be used as an interface by software components to communicate with each other. An API may include specifications for routines, data structures, object classes and variables. In the exemplary embodiment, mobile device 86 requests historical data from expense management system 16 and expense management system 16 retrieves 636 the requested data from expense manager database 120 and transmits the data to mobile device 86.

Mobile device 86 also requests 638 detailed invoice data associated with the selected invoice from expense management system 16 for display in the invoice details view. The invoice details view is a series of web pages, for example, HTML pages, that will display detailed invoice information. Expense management system 16 retrieves 640 the requested data from expense manager database 120 and transmits the data to mobile device 86. Mobile device 86 and more specifically, the application stored and executed by processing device 92, generates 642 a detailed invoice page for display on display device 94. More specifically, in at least one embodiment, the detailed invoice view will be a series of UIWebViews inside of a UIScrollView that allows the user to swipe through different pages of detail information. For closer inspection, an individual page will zoom to full-screen when tapped by the user. UIWebView is an application class developed and implemented by Apple Inc. that allows developers to embed web content in an iOS native application. Accordingly, one can create HTML pages that are viewed from within an iPad, iPod, iPhone native application. The UIScrollView class (also developed and implemented by Apple Inc.) provides support for displaying content that is larger than the size of the application's window. It enables users to scroll within that content by making swiping gestures, and to zoom in and back from portions of the content by making pinching gestures. A primary difference between a normal web interface and an iOS interface on an iPhone or iPad is that the latter must operate within a smaller screen footprint than a web interface, and incorporate less screen geography, accordingly economy in presentation of information is relevant.

In the exemplary embodiment, mobile device 86 also displays an invoice approval option, for example, a button on display device 94 that if selected, indicates that manager 98 provides authorization to pay the selected invoice on behalf of employer 20. In the exemplary embodiment, method 610 also includes determining 650 if manager 98 approves of the selected invoice. For example, if mobile device 86 receives an invoice approval selection from manager 98 via input device 96, mobile device 86 generates 652 an invoice approval signal and transmits the invoice approval signal to expense management system 16. Alternatively, upon selection of the invoice approval selection, mobile device 86 may transmit the approved invoice to expense management system 16. Once the selected invoice is approved, method 610 includes updating 654 the list of invoices awaiting approval. Moreover, method 610 may also include confirming the invoice approval selection, for example, by displaying an additional approval selection (e.g., a popup alert box), asking manager 98 if the selected invoice is approved. This confirmation prevents submission of an invoice as approved after an inadvertent or accidental selection of the invoice approval selection.

If mobile device 86 determines 650 that the selected invoice has not been approved by manager 98, for example, based on an input from manager 98 requesting to return to the list of invoices awaiting approval (e.g., pressing a "back" selection), mobile device 86 again generates 630 a list of invoices awaiting approval from the invoice data and displays the list on display device 94.

Figure 10:
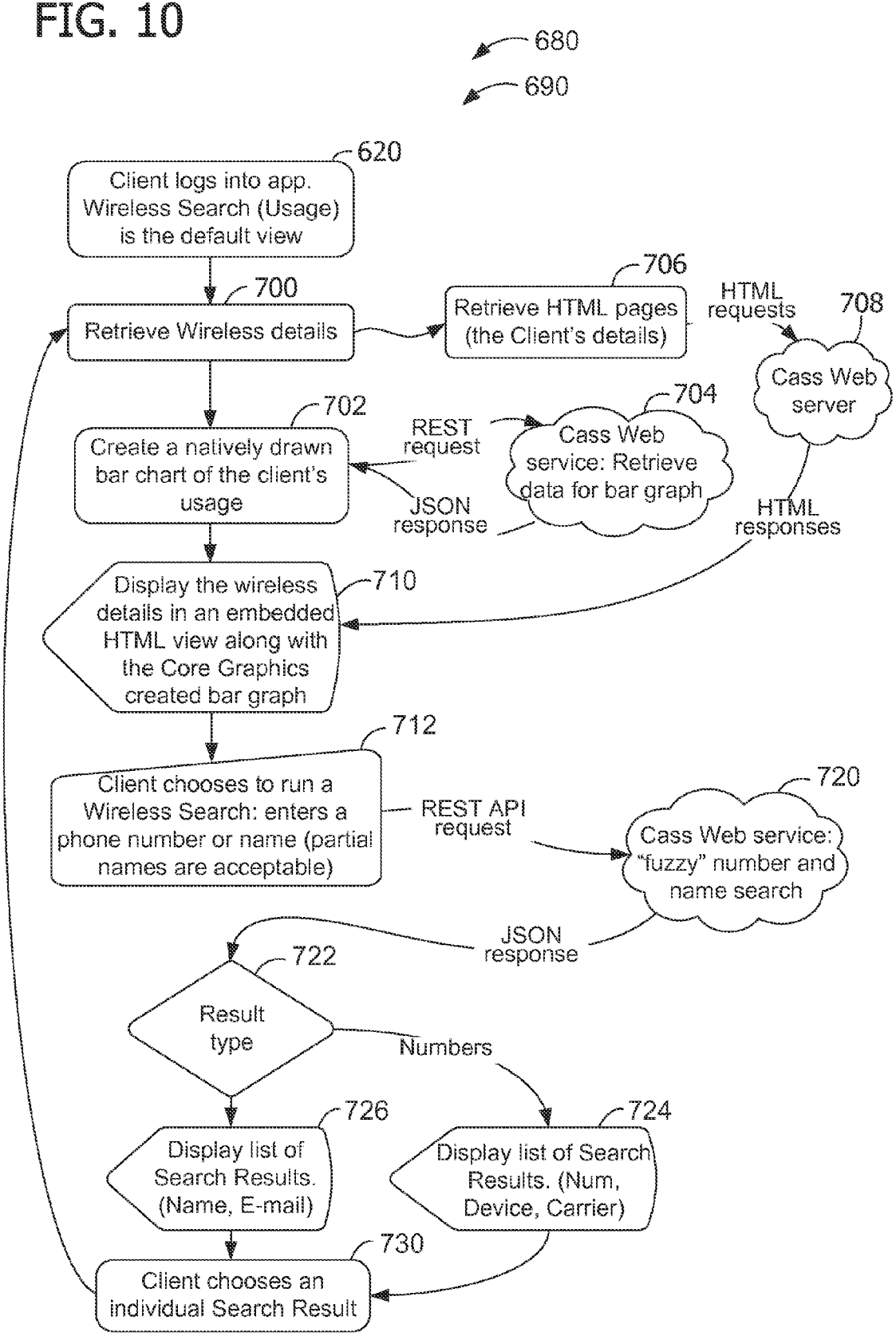
FIG. 10 is a flow chart of an exemplary method for communicating usage data between the expense management system shown in FIGS. 2 and 3 and a mobile device.

FIG. 10 is a flow chart 680 of an exemplary method 690 for communicating usage data between a mobile device, for example, mobile device 86 (shown in FIG. 1), and an expense management system, for example, expense management system 16 (shown in FIG. 1). In the exemplary embodiment, communicating usage data includes performing a search of wireless numbers in response to a wireless number query from a user, for example, manager 98 (shown in FIG. 1) of a mobile device, for example, mobile device 86. In the exemplary embodiment, method 680 includes logging into 620 expense management system 16 using mobile device 86. In the exemplary embodiment, review wireless usage option 546 (shown in FIG. 8) is a default option. For example, upon receiving the authorization signal from expense management system 16, mobile device 86 displays a usage view. In an alternative embodiment, method 690 includes receiving an input corresponding to a review wireless usage option, for example, review wireless usage option 546 (shown in FIG. 8), selection from manager 98.

In the exemplary embodiment, method 690 includes retrieving 700 wireless usage data to be displayed in a usage view by display device 94. The usage view may include, but is not limited to, a graph view and a usage details view. In the exemplary embodiment, mobile device 86 generates 702 a natively drawn graphic representing historical totals associated with wireless usage associated with employer 20. For example, the graphic may include a bar chart illustrating total wireless usage by employees of employer 20 for a predefined number of months prior to the current month. More specifically, in at least one embodiment, the graph view is a representation of the wireless usage, for example, over the past 3 to 13 months. The graphic is created natively by processing device 92 using, for example, Core Graphics and/or Core Animation APIs. In the exemplary embodiment, mobile device 86 requests historical data from expense management system 16 and expense management system 16 retrieves 704 the requested data from expense manager database 120 and transmits the data to mobile device 86.

Mobile device 86 also requests 706 detailed usage data associated with employer 20 from expense management system 16 for display in the usage details view. The usage details view is a series of web pages, for example, HTML pages, that will display detailed usage information. Expense management system 16 retrieves 708 the requested data from expense manager database 120 and transmits the data to mobile device 86. Mobile device 86 and more specifically, the application stored and executed by processing device 92, generates 710 a detailed usage page for display on display device 94. More specifically, in at least one embodiment, the detailed usage view will be a series of UIWebViews inside of a UIScrollView that allows the user to swipe through different pages of detail information. For closer inspection, an individual page will zoom to full-screen when tapped by the user.

In the exemplary embodiment, method 690 includes providing 712 a wireless device search option. For example, mobile device 86 may display the wireless device search option, for example, as a button on display device 94 that if selected, indicates that manager 98 desires to perform a search of wireless device data stored within expense management system 16. For example, mobile device 86 may display a field that allows manager 98 to input search criteria. The search criteria may include at least a portion of a wireless identification number. The wireless identification number may include, but is not limited to, a mobile phone number, a device identifier such as a mobile identification number (MIN), an electronic serial number (ESN), an internet protocol (IP) address), and/or any other number that uniquely identifies one wireless device. The search criteria may also include at least a portion of a user name or identifier. The user name or identifier may include, but is not limited to, a user name, an employee number, and/or any other identifier that uniquely identifies an employee of employer 20. Mobile device 86 generates a wireless search request signal that includes the search criteria and transmits the signal to expense management system 16. Expense management system 16 performs 720 a search of usage data stored within expense manager database 120 and transmits search result data associated with the results of the search back to mobile device 86.

In the exemplary embodiment, method 690 includes determining 722 if the search result data received from expense management system 16 is wireless number data or user name data. If the search result data is wireless number data, mobile device 86 displays 724 a list of search results that includes, but is not limited to, wireless identification numbers, device names, and/or service providers that provide service associated with the wireless identification numbers returned after applying the search criteria. If the data is user name data, mobile device 86 displays 726 a list of search results that includes, but is not limited to, user names and/or e-mail addresses that were returned after applying the search criteria.

In the exemplary embodiment, method 690 also includes receiving 730 a usage details selection from manager 98. For example, mobile device 86, and more specifically, input device 96, receives 730 an input signal from manager 98 that corresponds to a selection of one of the plurality of search results included within the list. When manager 98 selects a specific search result (e.g., by tapping on it), mobile device 86 provides manager 98 with the graph view and the usage details view of data associated with the selected search result.

Figure 11:
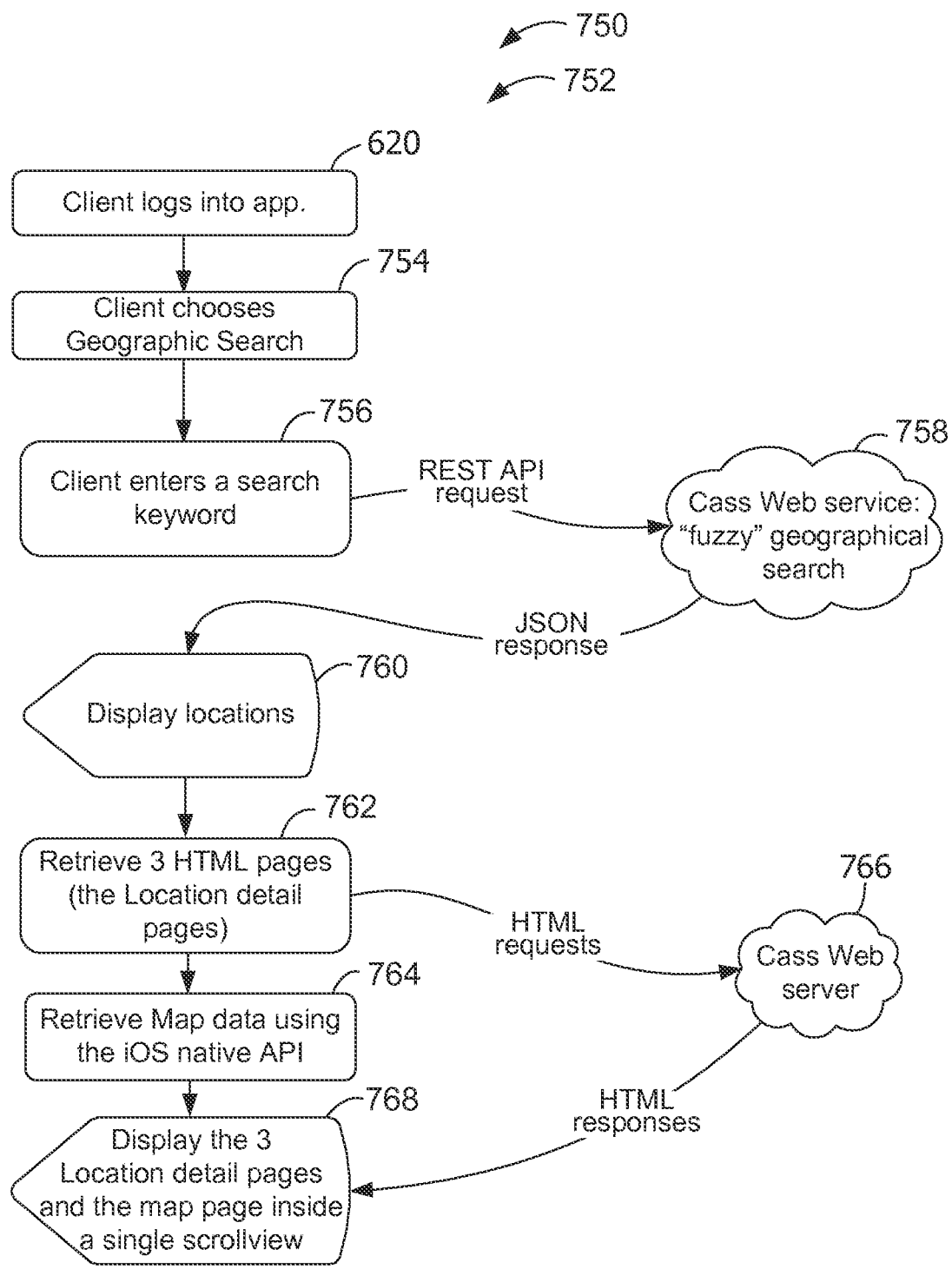
FIG. 11 is a flow chart of an exemplary method for communicating usage data between the expense management system shown in FIGS. 2 and 3 and a mobile device associated with a specified geographical location.

FIG. 11 is a flow chart 750 of an exemplary method 752 for communicating usage data, within or around a specified geographical location, between a mobile device, for example, mobile device 86 (shown in FIG. 1), and an expense management system, for example, expense management system 16 (shown in FIG. 1). Communicating usage data associated with a geographical location facilitates an additional level of analysis of wireless usage by employees of employer 20 by manager 98. In the exemplary embodiment, communicating usage data within or around a specified geographical location includes performing a search of wireless devices defined as within a predefined distance of the specified geographical location. For example, each wireless device associated with employer 20 is assigned a location. The location may include, but is not limited to, a location of a place of employment of the user associated with the wireless device, a cost center associated with the wireless device, and/or an area code of the phone number associated with the wireless device.

In the exemplary embodiment, method 752 includes logging into 620 expense management system 16 using mobile device 86. In the exemplary embodiment, method 752 includes receiving 754 an input corresponding to a geographic location search option, for example, geographic location search option 550 (shown in FIG. 8), selection from manager 98. In the exemplary embodiment, method 752 includes receiving 756 a geographic location search criteria via input device 96 from manager 98. For example, mobile device 86 may display a field that allows manager 98 to input search criteria. The geographic location search criteria may include, but is not limited to, a city name, a state name, a zip code, and/or any other geographical descriptor that allows the application executed by mobile device 86 to function as described herein. Mobile device 86 generates a geographic location search request signal that includes the search criteria and transmits the signal to expense management system 16. Expense management system 16 performs 758 a search of usage data stored within expense manager database 120 and transmits search result data associated with the results of the search back to mobile device 86.

In the exemplary embodiment, method 752 includes displaying 760 a list of locations returned as part of the search results from expense management system 16. For example, mobile device 86 may display 760 the list of locations on display device 94. Mobile device 86, and more specifically, input device 96, receives an input signal from manager 98 that corresponds to a selection of one of the locations included within the list. When manager 98 selects a specific location (e.g., by tapping on it), mobile device 86 provides manager 98 with a map view and a location details view of data associated with the selected location.

In the exemplary embodiment, method 752 includes retrieving 762 usage data associated with the selected location to be displayed in a location usage view by display device 94. The location usage view may include, but is not limited to, a map view and a location usage details view. In the exemplary embodiment, mobile device 86 generates 764 a natively drawn map for display by display device 94. For example, the map may be created natively by processing device 92 using, for example, a native API developed under the name MapKit™ by DeLorme Publishing Company, Inc.

Mobile device 86 also requests 766 detailed usage data associated with the selected location from expense management system 16 for display in the location details view. The location may be selected by manager 98 by touching a location on the displayed map. The location details view is a series of web pages, for example, HTML pages, that will display detailed usage information associated with the selected location. Expense management system 16 retrieves the requested data from expense manager database 120 and transmits the data to mobile device 86. Mobile device 86 and more specifically, the application stored and executed by processing device 92, generates 766 the detailed location usage page for display 768 on display device 94. More specifically, in at least one embodiment, the detailed location usage view will be a series of UIWebViews inside of a UIScrollView that allows the user to swipe through different pages of detail information. For closer inspection, an individual page will zoom to full-screen when tapped by the user.

Figure 12:
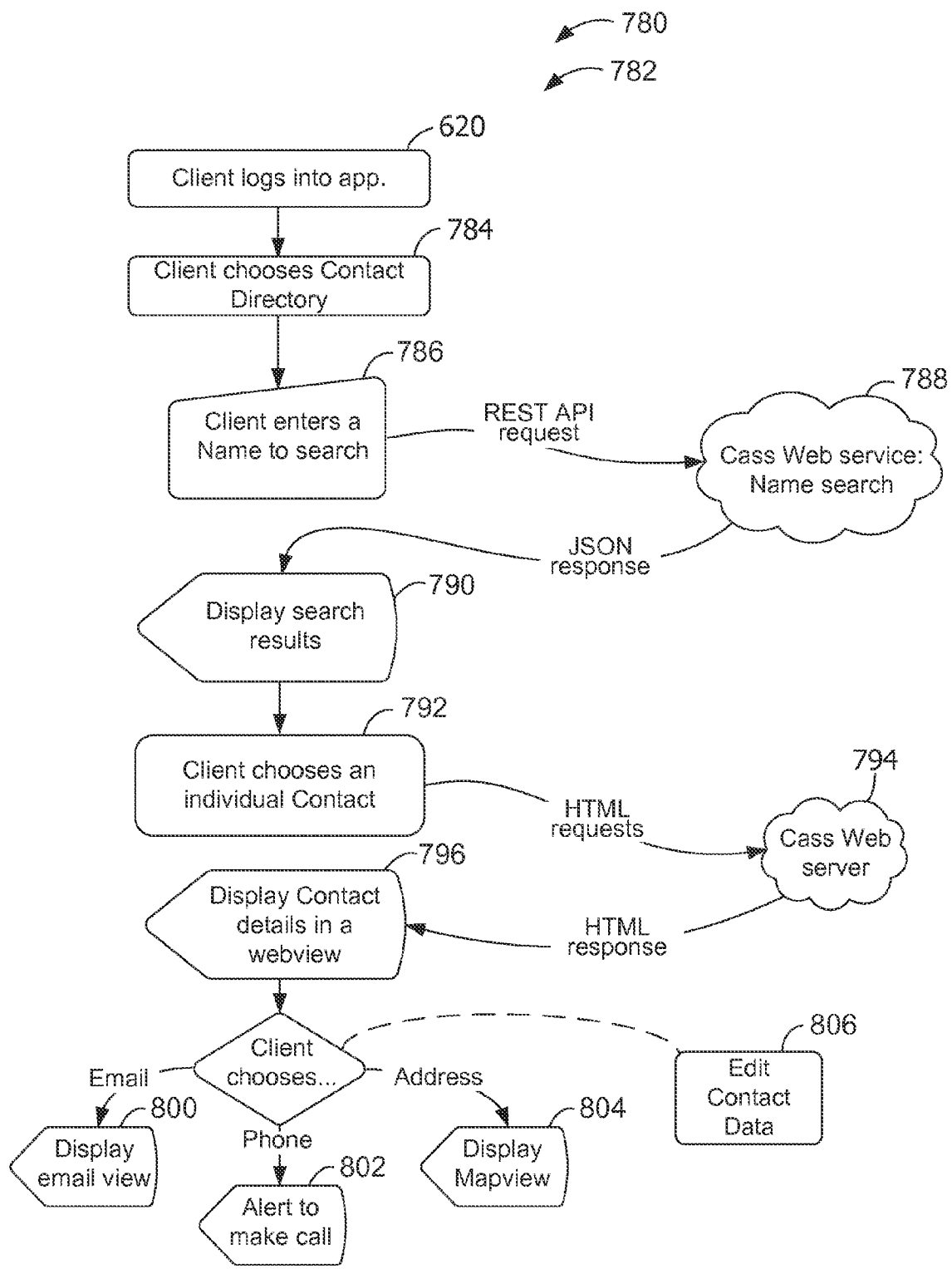
FIG. 12 is a flow chart of an exemplary method for communicating contact directory data between the expense management system shown in FIGS. 2 and 3 and a mobile device.

FIG. 12 is a flow chart 780 of an exemplary method 782 for communicating contact directory data between a mobile device, for example, mobile device 86 (shown in FIG. 1), and an expense management system, for example, expense management system 16 (shown in FIG. 1). Communicating contact directory data to mobile device 86 provides a user of mobile device 86 with access to a directory of contact information. In the exemplary embodiment, this directory includes phone numbers of all mobile devices included in invoices paid by expense management system 16.

In the exemplary embodiment, method 782 includes logging into 620 expense management system 16 using mobile device 86. In the exemplary embodiment, method 782 includes receiving 784 an input corresponding to a contacts directory search option, for example, contacts directory search option 548 (shown in FIG. 8), selection from manager 98. In the exemplary embodiment, method 782 includes receiving 786 a contacts directory search criteria via input device 96 from manager 98. For example, mobile device 86 may display a field that allows manager 98 to input search criteria. The contact directory search criteria may include, but is not limited to, a first name, a last name, and/or any portion thereof. Mobile device 86 generates a contacts directory search request signal that includes the search criteria and transmits the signal to expense management system 16. Expense management system 16 performs 788 a search of contacts directory data stored within expense manager database 120 and transmits search result data associated with the results of the search back to mobile device 86.

In the exemplary embodiment, method 782 includes displaying 790 a list of contacts (e.g., employee names) returned as part of the search results from expense management system 16. For example, mobile device 86 may display 790 the list of contacts on display device 94. Mobile device 86, and more specifically, input device 96, receives 792 an input signal from manager 98 that corresponds to a selection of one of the contacts included within the list. When manager 98 selects a specific contact (e.g., by tapping on it), mobile device 86 provides manager 98 with a details view of data associated with the selected contact.

Mobile device 86 also requests 794 contact directory data associated with the selected contact from expense management system 16 for display in contact details view. The contact details view may include a single web page, or a series of web pages, for example, HTML pages, that will display detailed contact information associated with the selected contact. Expense management system 16 retrieves the requested data from expense manager database 120 and transmits the data to mobile device 86. Mobile device 86 and more specifically, the application stored and executed by processing device 92, generates 796 the contact details page for display by display device 94. More specifically, in at least one embodiment, the contacts detail view will be a series of UIWebViews inside of a UIScrollView that allows the user to swipe through different pages of detail information. For closer inspection, an individual page will zoom to full-screen when tapped by the user.

In the exemplary embodiment, within the contact details view, mobile device 86 also provides 800 a compose message option. For example, mobile device 86 may display a compose message button that, when selected, addresses a message to the selected contact. The message may include, but is not limited to, an electronic mail (e-mail) message or an SMS text message. Alternatively, manager 98 may select the compose message option by touching the e-mail address displayed within the contact details view.

In the exemplary embodiment, within the contact details view, mobile device 86 may also provide 802 a dial phone option. For example, mobile device 86 may display a dial phone button that, when selected, dials the phone number associated with the selected contact to initiate a phone call to the contact. Alternatively, manager 98 may select the dial phone option by touching the phone number displayed within the contact details view.

In the exemplary embodiment, within the contact details view, mobile device 86 may also provide 804 a map view option. For example, mobile device 86 may display a map view button that, when selected, causes mobile phone 86 to generate a map showing the location associated with the selected contact. More specifically, the contact details view may include a residential address for the selected contact. When the map view button is selected, a map is displayed on display device 94 showing the residential address and a predefined area around the residential address. Alternatively, manager 98 may select the map view option by touching the address displayed within the contact details view.

In an exemplary embodiment, mobile device 86 may also provide 806 a contacts edit option, in which the user will be able to enter, edit or remove specific information regarding a contact, or remove the contact entirely.

Described herein are exemplary methods and systems for reviewing and approving of invoices using a mobile device. More specifically, a computer executable program is provided that when executed on the mobile device, allows a user to review and approve invoices wherever the mobile device is able to receive data. The program executed on the mobile device is configured to facilitate performing the methods described herein, without use of a full-function web browser. The limited functionality of the program reduces the size of the program when compared to a full-function web browser. The limited functionality of the program also minimizes the data transferred between the mobile device and a central system, which allows for suitable operation of the mobile device and system when data transfer rates are lower than, for example, a high speed Internet connection.

The methods and systems described herein facilitate efficient and economical payment of expenses. Exemplary embodiments of methods and systems are described and/or illustrated herein in detail. The methods and systems are not limited to the specific embodiments described herein, but rather, components of each system, as well as steps of each method, may be utilized independently and separately from other components and steps described herein. Each component, and each method step, can also be used in combination with other components and/or method steps.

When introducing elements/components/etc. of the methods and systems described and/or illustrated herein, the articles "a", "an", "the", and "said" are intended to mean that there are one or more of the element(s)/component(s)/etc. The terms "comprising", "including", and "having" are intended to be inclusive and mean that there may be additional element(s)/component(s)/etc. other than the listed element(s)/component(s)/etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for communicating expense management data, said method comprising:

transmitting at least one of a user identifier and a password from a first mobile device to an expense management system, wherein the first mobile device includes a memory device and a display device coupled to a processing device, and wherein the first mobile device is associated with a first user;

displaying at least one service option on the display device, wherein the at least one service option is one of a review invoice option, a review wireless usage option, a contacts directory search option, and a geographic location search option, wherein the expense management system determines the at least one service option displayed on the display device based on a security level associated with the user identifier;

transmitting a request signal associated with a user selection of the at least one service option from the first mobile device to the expense management system, wherein the request signal includes an identifier indicative of the request signal being transmitted from a mobile device, and wherein the request signal includes at least one of a mobile phone number and a mobile device identifier used to perform a wireless device search;

receiving data associated with the user selection at the first mobile device, wherein the data is transmitted from the expense management system, and the expense management system selects the data for transmission to the first mobile device based on the security level associated with the user identifier; and generating at least one output, using the processing device at the first mobile device, based on the received data, wherein the received data is associated with usage of at least a second mobile device associated with a second user.

2. A method in accordance with claim 1, further comprising storing at least one mobile device application in the memory device, wherein the at least one mobile device application facilitates communicating expense management data using the first mobile device.

3. A method in accordance with claim 2, wherein the at least one mobile device application comprises at least one code segment that, when executed by the processing device, allows the first user to interact with the expense management system.

4. A method in accordance with claim 3, wherein the at least one mobile device application is configured to only perform operations associated with communicating expense management data.

5. A method in accordance with claim 1, wherein display of one of the review wireless usage option and the contacts directory search option requires a first security level associated with the user identifier, display of the geographic location search option requires a second security level associated with the user identifier that is higher than the first security level, and display of the review invoice option requires a third security level associated with the user identifier that is higher than the second security level.

6. A method in accordance with claim 1, wherein the expense management system is configured to store expense management data corresponding to an employer, and wherein employees of the employer are assigned user identifier/password combinations, and wherein a security level is assigned to each user identifier that defines the service options accessible by the associated employee.

7. A method in accordance with claim 1, further comprising:

executing a mobile device application on the first mobile device, wherein the mobile device application comprises at least one of:

enabling the first user to alter the size of a portion of a display on the display device;

retrieving invoice data from a database remote from the first mobile device;

displaying one or more invoice pages;

displaying an invoice approval option.

8. A method in accordance with claim 7, wherein displaying an invoice approval option further comprises:

displaying an invoice approval button, selection of which causes transmission of a signal indicating approval of an invoice.

9. A method in accordance with claim 1, wherein the at least one output includes at least one of a report, and a graphic display.

10. A method in accordance with claim 1, wherein displaying at least one service option on the display device requires the first user to be a registered user of the expense management system.

11. A method in accordance with claim 1, wherein transmitting a request signal includes transmitting a request signal indicating a selection of the review wireless usage option, the request signal including at least one of a mobile phone number and a mobile device identifier associated with a search, wherein the mobile device identifier is at least one of a mobile identification number (MIN), an electronic serial number (ESN), an internet protocol (IP) address).

12. A system for communicating expense management data, said system comprising:

a first mobile device associated with a first user, wherein said first mobile device includes a memory device and a display device coupled to a processing device; and a database configured to store data associated with at least one of at least one second user, an expense resource, and an expense management system;

the first mobile device being configured to:

transmit at least one of a user identifier and a password to the expense management system;

display at least one service option on the display device, wherein the at least one service option is one of a review invoice option, a review wireless usage option, a contacts directory search option, and a geographic location search option, wherein the expense management system determines the at least one service option displayed on the display device based on a security level associated with the user identifier;

transmit a request signal associated with a user selection of the at least one service option from the first mobile device to the expense management system, wherein the request signal includes an identifier indicative of the request signal being transmitted from a mobile device, and wherein the request signal includes at least one of a mobile phone number and a mobile device identifier used to perform a wireless device search;

receive data associated with the user selection at the first mobile device, wherein the data is transmitted from the expense management system, and the expense management system selects the data for transmission to the first mobile device based on the security level associated with the user identifier; and generate at least one output, using the processing device, based on the received data wherein the received data is associated with usage of at least a second mobile device associated with the second user.

13. A system for communicating expense management data in accordance with claim 12, wherein the first mobile device is further configured to:

store at least one mobile device application in the memory device, wherein the at least one mobile device application facilitates communicating expense management data.

14. A system for communicating expense management data in accordance with claim 13, wherein the at least one mobile device application comprises at least one code segment that, when executed by the processing device, allows the first user to interact with the expense management system.

15. A system for communicating expense management data in accordance with claim 14, wherein the at least one mobile device application is configured to only perform operations associated with communicating expense management data.

16. A system for communicating expense management data in accordance with claim 12, wherein display of one of the review wireless usage option and the contacts directory search option requires a first security level associated with the user identifier, display of the geographic location search option requires a second security level associated with the user identifier that is higher than the first security level, and display of the review invoice option requires a third security level associated with the user identifier that is higher than the second security level.

17. A system for communicating expense management data in accordance with claim 12, wherein the expense management system is configured to store expense management data corresponding to an employer, and wherein employees of the employer are assigned user identifier/password combinations, and wherein a security level is assigned to each user identifier that defines the service options accessible by the associated employee.

18. A system for communicating expense management data in accordance with claim 12, wherein the first mobile device is further configured to:
execute a mobile device application, wherein the mobile device application comprises at least one of:
enabling the first user to alter the size of a portion of a display on the display device;
retrieving invoice data from a database remote from the first mobile device;
displaying one or more invoice pages;
displaying an invoice approval option.

19. A system for communicating expense management data in accordance with claim 18, wherein displaying an invoice approval option further comprises:
displaying an invoice approval button, selection of which causes transmission of a signal indicating approval of an invoice.

20. A system for communicating expense management data in accordance with claim 12, wherein the at least one output includes at least one of a report, and a graphic display.

21. A system for communicating expense management data in accordance with claim 12, wherein displaying at least one service option on the display device requires the first user to be a registered user of the expense management system.

22. A system in accordance with claim 12, wherein transmitting a request signal includes transmitting a request signal indicating a selection of the review wireless usage option, the request signal including at least one of a mobile phone number and a mobile device identifier associated with a search, wherein the mobile device identifier is at least one of a mobile identification number (MIN), an electronic serial number (ESN), an internet protocol (IP) address).

23. A mobile device for communicating expense management data that includes a memory device and a display device coupled to a processing device, said mobile device configured to:
transmit at least one of a user identifier and a password to an expense management system, wherein said mobile device is a first mobile device associated with a first user, and the user identifier and password are associated with the first user;
display at least one service option on the display device, wherein the at least one service option is one of a review invoice option, a review wireless usage option, a contacts directory search option, and a geographic location search option, wherein the expense management system determines the at least one service option displayed on the display device based on a security level associated with the user identifier;
transmit a request signal associated with a user selection of the at least one service option from the first mobile device to the expense management system, wherein the request signal includes an identifier indicative of the request signal being transmitted from a mobile device, and wherein the request signal includes at least one of a mobile phone number and a mobile device identifier used to perform a wireless device search;
receive data associated with the user selection at the first mobile device, wherein the data is transmitted from the expense management system, and the expense management system selects the data for transmission to the first mobile device based on the security level associated with the user identifier; and
generate at least one output, using the processing device, based on the received data, wherein the received data is associated with usage of at least a second mobile device associated with a second user.

24. A mobile device in accordance with claim 23, wherein display of one of the review wireless usage option and the contacts directory search option requires a first security level associated with the user identifier, display of the geographic location search option requires a second security level associated with the user identifier that is higher than the first security level, and display of the review invoice option requires a third security level associated with the user identifier that is higher than the second security level.

25. A mobile device in accordance with claim 23, wherein the expense management system is configured to store expense management data corresponding to an employer, and wherein employees of the employer are assigned user identifier/password combinations, and wherein a security level is assigned to each user identifier that defines the service options accessible by the associated employee.

26. A mobile device in accordance with claim 23, wherein said first mobile device is further configured to:
execute a mobile device application, wherein the mobile device application comprises at least one of:
enabling the first user to alter the size of a portion of a display on the display device;
retrieving invoice data from a database remote from the first mobile device;
displaying one or more invoice pages;
displaying an invoice approval option.

27. A mobile device in accordance with claim 26, wherein said first mobile device is further configured to:
display an invoice approval button, selection of which causes transmission of a signal indicating approval of an invoice.

28. A mobile device in accordance with claim 23, wherein the at least one output includes at least one of a report, and a graphic display.

29. A mobile device in accordance with claim 23, wherein displaying at least one service option on the display device requires the user to be a registered user of the expense management system.

30. A mobile device in accordance with claim 23, wherein transmitting a request signal associated with a user selection of the at least one service option to the expense management system includes transmitting a request signal indicating a selection of the review wireless usage option, the request signal including at least one of a mobile phone number and a mobile device identifier associated with a search, wherein the mobile device identifier is at least one of a mobile identification number (MIN), an electronic serial number (ESN), an internet protocol (IP) address).

31. A mobile device for communicating expense management data, wherein said mobile device includes a memory device and a display device coupled to a processing device, said mobile device configured to:
   transmit at least one of a user identifier and a password to an expense management system;
   display at least one service option on the display device, wherein the at least one service option is one of a review invoice option, a review wireless usage option, a contacts directory search option, and a geographic location search option, wherein the expense management system determines which service option to display based on the security level;
   transmit a request signal associated with a user selection of the at least one service option to the expense management system, wherein the request signal includes an identifier indicative of the request signal being transmitted from a mobile device, and wherein the request signal includes at least one of a mobile phone number and a mobile device identifier used to perform a wireless device search;
   receive data associated with the user selection, wherein the data is transmitted from the expense management system, and the expense management system selects the data for transmission to said mobile device based on the security level associated with the identifier; and
   generate at least one output, using the processing device, based on the received data;
   wherein said mobile device further comprises at least one mobile device application stored in the memory device, wherein the at least one mobile device application facilitates communicating expense management data using the mobile device.

32. A mobile device in accordance with claim 31, wherein the at least one mobile device application comprises at least one code segment that, when executed by the processing device, allows the user to interact with the expense management system.

33. A mobile device in accordance with claim 32, wherein the at least one mobile device application is configured to only perform operations associated with communicating expense management data.

* * * * *